United States Patent
Timms et al.

(10) Patent No.: US 6,932,374 B1
(45) Date of Patent: Aug. 23, 2005

(54) TRAILER HITCH COUPLING KIT

(76) Inventors: Tamara Timms, 24 South St., Mobile, AL (US) 36606; Don Timms, 24 South St., Mobile, AL (US) 36606

( * ) Notice: Subject to any disclaimer, the term of this patent is extended or adjusted under 35 U.S.C. 154(b) by 0 days.

(21) Appl. No.: 10/849,888

(22) Filed: May 21, 2004

(51) Int. Cl.[7] .................................................. B60D 1/06
(52) U.S. Cl. ...................... 280/477; 359/872; 359/844; 248/479; 248/467
(58) Field of Search ................................ 280/477, 432; 359/871, 872, 844; 248/466, 467, 476, 479

(56) References Cited

U.S. PATENT DOCUMENTS

| | | |
|---|---|---|
| 4,905,376 A | 3/1990 | Neeley |
| 4,925,287 A | 5/1990 | Lord et al. |
| 5,111,342 A | 5/1992 | Quesada |
| 5,180,182 A | 1/1993 | Haworth |
| 5,269,554 A | 12/1993 | Law et al. |
| 5,290,056 A | 3/1994 | Fath, IV |
| 5,313,337 A | 5/1994 | Byers |
| 5,482,310 A | 1/1996 | Staggs |
| 5,625,500 A | 4/1997 | Ackerman |
| 5,657,175 A | 8/1997 | Brewington |
| 5,784,213 A | 7/1998 | Howard |
| 5,825,564 A | 10/1998 | Mazarac |
| 5,971,555 A | 10/1999 | Wilcox et al. |
| 6,102,423 A | 8/2000 | Beck et al. |
| 6,213,608 B1 * | 4/2001 | Osgood ...................... 359/841 |
| 6,612,603 B2 | 9/2003 | Alger |
| 6,619,685 B2 | 9/2003 | Teague |
| 2003/0047909 A1 * | 3/2003 | Alger ........................ 280/477 |
| 2003/0209880 A1 * | 11/2003 | Koestler ..................... 280/477 |

FOREIGN PATENT DOCUMENTS

GB 2161769 * 1/1986 ............ B60D 1/06

* cited by examiner

Primary Examiner—Avraham Lerner
(74) Attorney, Agent, or Firm—Richard C. Litman (57) ABSTRACT

The trailer hitch coupling kit is a kit for aiding a driver in coupling the tow ball of a towing vehicle and the socket of a trailer coupler, by enabling the driver to view the tow ball and a guidepost mounted onto the trailer drawbar while seated in the driver's seat of the towing vehicle. It includes a mirror assembly with two pivotally connected support legs, a pair of foot members that allow for attachment of the mirror assembly to the rear of a towing vehicle in three distinct manners, a trailer drawbar guidepost with a magnetic base and a carrying case.

10 Claims, 11 Drawing Sheets

TRAILER HITCH COUPLING KIT

BACKGROUND OF THE INVENTION

1. Field of the Invention

The present invention relates to aids for securing a trailer to a towing vehicle and, more particularly, to a trailer hitch coupling kit for aiding in coupling the tow ball of a towing vehicle and the socket of a trailer coupler, by enabling the driver of the towing vehicle to view the tow ball and a guidepost mounted on the trailer drawbar while in the driver's seat.

2. Description of the Related Art

It is well known that connecting a trailer to a towing vehicle is a difficult task when performed by one person. The difficulty arises from the need to position the tow ball of the towing vehicle under the socket of the trailer coupler. Typically, when a lone person backs a towing vehicle toward a trailer, neither the tow ball nor the trailer coupler are visible while he or she is in the driver's seat of the towing vehicle. Therefore, he or she must maneuver the vehicle back and forth numerous times, getting out of the vehicle each time to check on the positioning of the tow ball and trailer coupler socket until he or she has positioned the tow ball just beneath the trailer coupler socket. Although a mirror attached to the rear of the towing vehicle can enable the driver to see the tow ball as he or she backs up, such a mirror cannot enable the driver to also see the trailer coupler until the driver has already aligned the tow ball fairly close to it. Thus, a need exists for a better means of connecting a trailer to a towing vehicle.

Numerous patents teach a mirror assembly that mounts to the rear of a vehicle. These include U.S. Pat. No. 4,905,376 issued Mar. 6, 1990 to R. P. Neeley (apparatus for facilitating trailer hitch element alignment); U.S. Pat. No. 4,925,287 issued May 15, 1990 to B. Lord et al. (mirror assembly for facilitating hitch element alignment); U.S. Pat. No. 5,111,342 issued May 5, 1992 to D. M. Quesada (hitch-viewing mirror assembly); U.S. Pat. No. 5,180,182 issued Jan. 19, 1993 to J. R. Haworth (trailer hitch alignment device); U.S. Pat. No. 5,313,337 issued May 17, 1994 to T. L. Byers (attachable vehicle mirror); U.S. Pat. No. 5,482,310 issued Jan. 9, 1996 to J. L. Staggs (trailer hitch mirror alignment device); U.S. Pat. No. 5,625,500 issued Apr. 29, 1997 to B. Ackerman (hitching mirror); U.S. Pat. No. 5,657,175 issued Aug. 12, 1997 to J. D. Brewington (reflector device for aligning the complementary components of a trailer hitch); U.S. Pat. No. 5,784,213 issued Jul. 21, 1998 to G. Howard (backup mirror for tow vehicle); U.S. Pat. No. 5,825,564 issued Oct. 20, 1998 to K. P. Mazarac (rear-mounted vehicle mirror); U.S. Pat. No. 5,971,555 issued Oct. 26, 1999 to L. M. Wilcox et al. (hitch viewing mirror assembly and method); U.S. Pat. No. 6,102,423 issued Aug. 15, 2000 to H. S. Beck et al. (visual alignment aid for connecting trailers); and U.S. Pat. No. 6,619,685 issued Sep. 16, 2003 to G. Q. Teague (universal trailer hitch mirror system).

Although useful for viewing a tow ball from the driver's seat of a towing vehicle, each of these devices has several drawbacks when used to couple the vehicle and a trailer. First, while each device provides a view of the tow ball, none also provides the driver with a reference to the location of the trailer coupler and, thus, each device is only useful to a driver once he or she has positioned the towing ball fairly close to the trailer coupler. Second, none of the devices easily adjusts into the position presenting the best view of the tow ball and provides a means for recording that position. Third, none of the devices disassembles and stores easily.

Additionally, U.S. Pat. No. 5,269,554 issued Dec. 14, 1993 to B. J. Law (trailer hitch alignment guide); U.S. Pat. No. 5,290,056 issued May 1, 1994 to A. F. Faith, IV (trailer hitch guide); and U.S. Pat. No. 6,612,603 issued Sep. 2, 2003 to M. D. Alger (trailer hitch alignment system) each teaches a guidepost for attachment to the tow ball of a towing vehicle and a guidepost for attachment to a trailer couple. The top of each guidepost is visible from the rear view mirror within a towing vehicle thereby allowing the tow ball to be positioned close to the trailer coupler. However, because none of these devices includes a mirror mountable to the rear of the towing vehicle, it is difficult to align the trailer hitch socket precisely over the tow ball.

None of the above inventions and patents, taken either singly or in combination, is seen to describe the instant invention as claimed. Thus, a trailer hitch guide solving the aforementioned problems is desired.

SUMMARY OF THE INVENTION

The trailer hitch coupling kit includes a mirror assembly with two pivotally connected support legs, a pair of foot members that allow for attachment of the mirror assembly to the rear of a towing vehicle in three distinct manners, a trailer drawbar guidepost with a magnetic base, and a carrying case.

The kit provides the driver of a towing vehicle with both a view of the tow ball and a reference to the location of the trailer coupler and, thus, allows the driver to precisely align the trailer coupler socket over the tow ball without leaving the driver's seat. The components of the kit are easily assembled and disassembled, and conveniently store in a dedicated carrying case. The mirror assembly is configured to easily adjust into the position that presents the best view of the tow ball and provides a means for recording that position. The pair of foot members allows the mirror assembly to be attached to a vehicle in one of three distinct manners.

Accordingly, it is a principal object of the invention to provide the driver of a towing vehicle with both a view of the vehicle's tow ball and a reference to the location of a trailer coupler and, thus, allow the driver to precisely align the trailer coupler socket over the tow ball without leaving the driver's seat.

It is another object of the invention to provide a trailer hitch coupling kit with components that are easily assembled and disassembled, and conveniently store in a dedicated carrying case.

It is a further object of the invention to provide a trailer hitch coupling kit with a mirror assembly that is configured to easily adjust into the position that presents the best view of the tow ball and that provides a means for recording that position.

Still another object of the invention is to provide a trailer hitch coupling kit with a pair of foot members that allows the mirror assembly to be attached to a towing vehicle in one of three distinct manners.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 8:
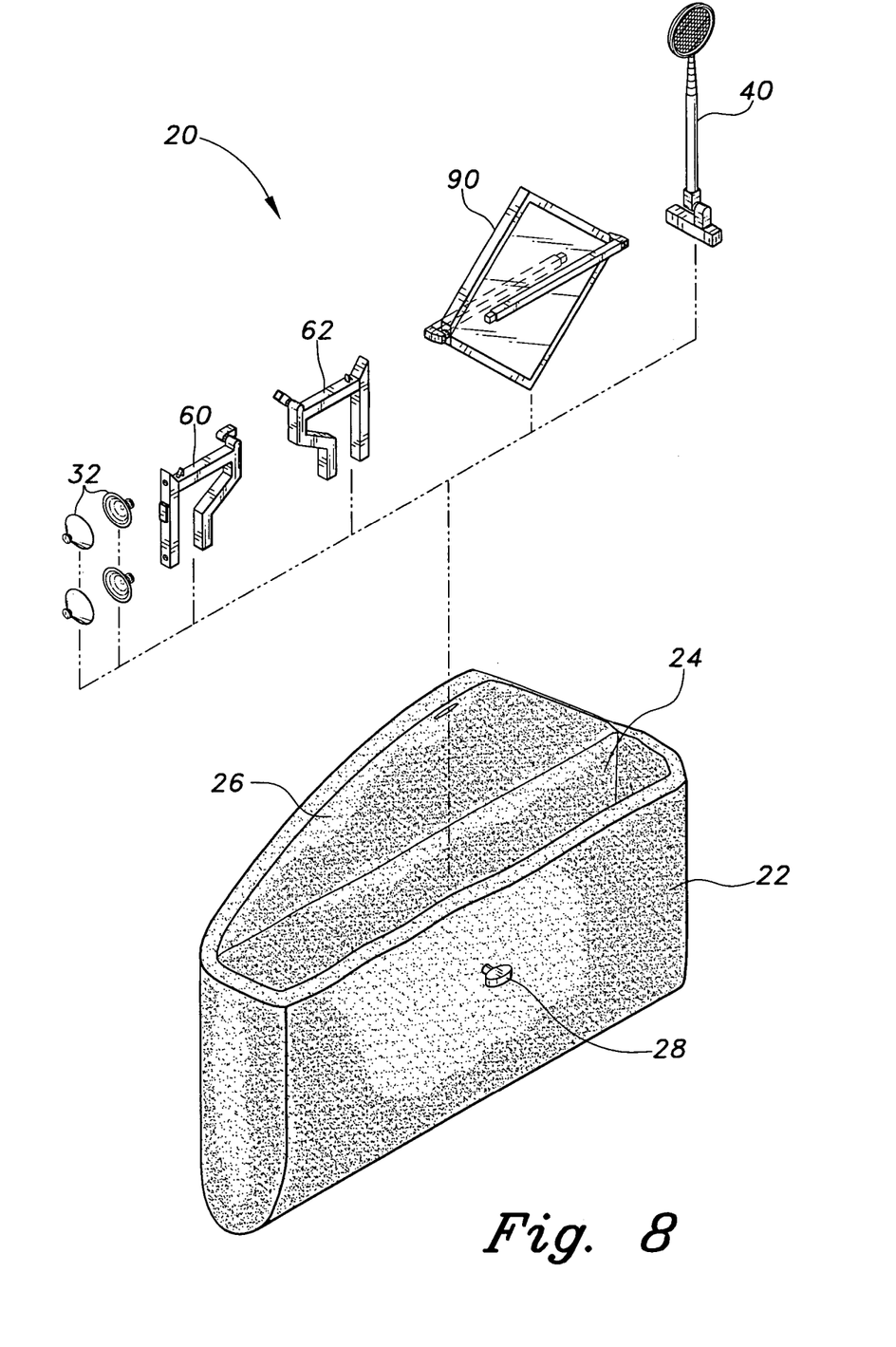
FIG. 8 is a perspective view of components of a trailer hitch coupling kit according to the present invention shown in relation to the carrying case.

Referring to the drawings, the present invention is a trailer hitch coupling kit designated generally as 20 in FIG. 8. The kit includes a mirror assembly 90, a guidepost 40, a pair of foot members 60 and 62 with a pair of suction cups 32 for each foot member 30 and a carrying case 22.

Figure 3:
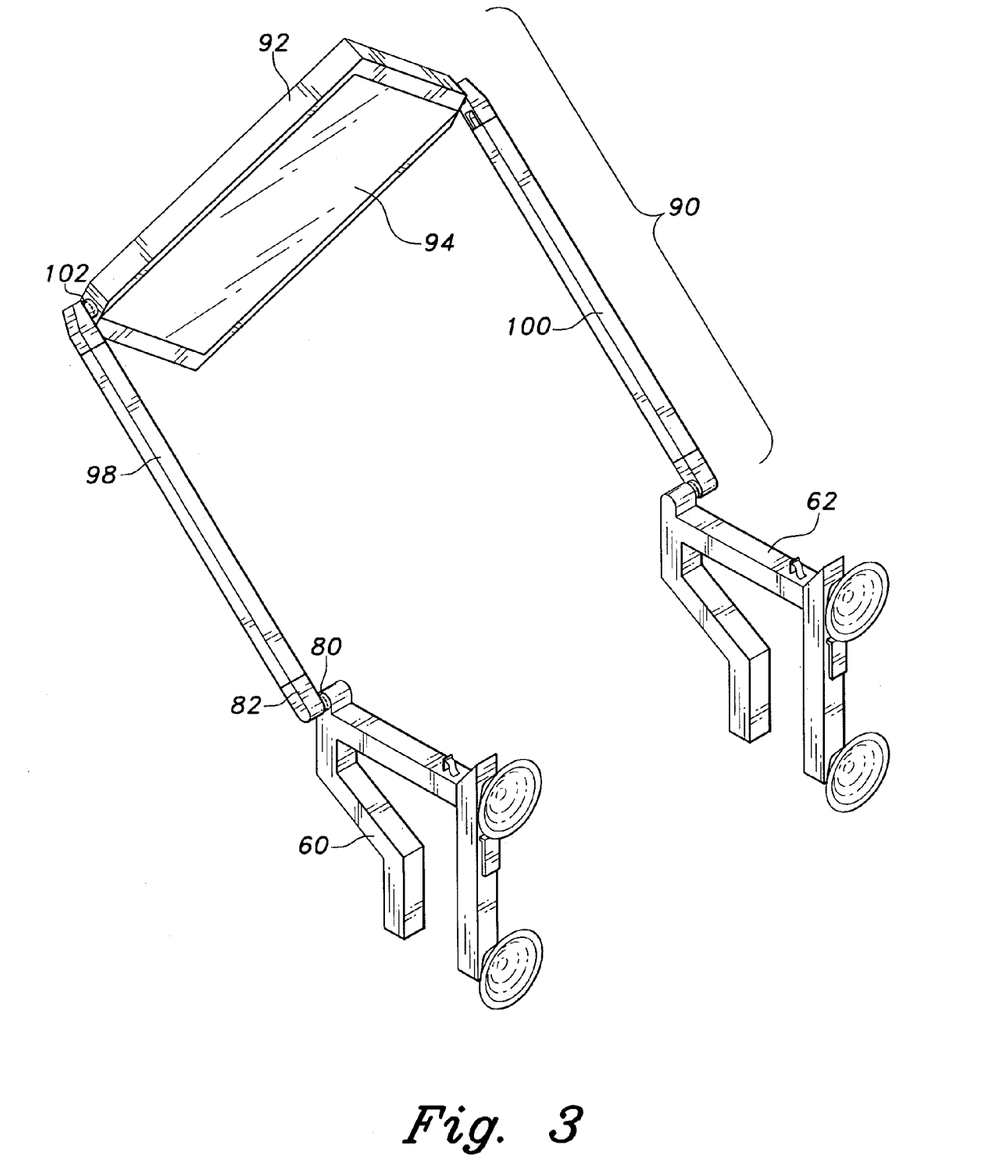
FIG. 3 is a perspective view of a mirror assembly with a pair of foot members connected thereto for a trailer hitch coupling kit according to the present invention.
Figure 9:
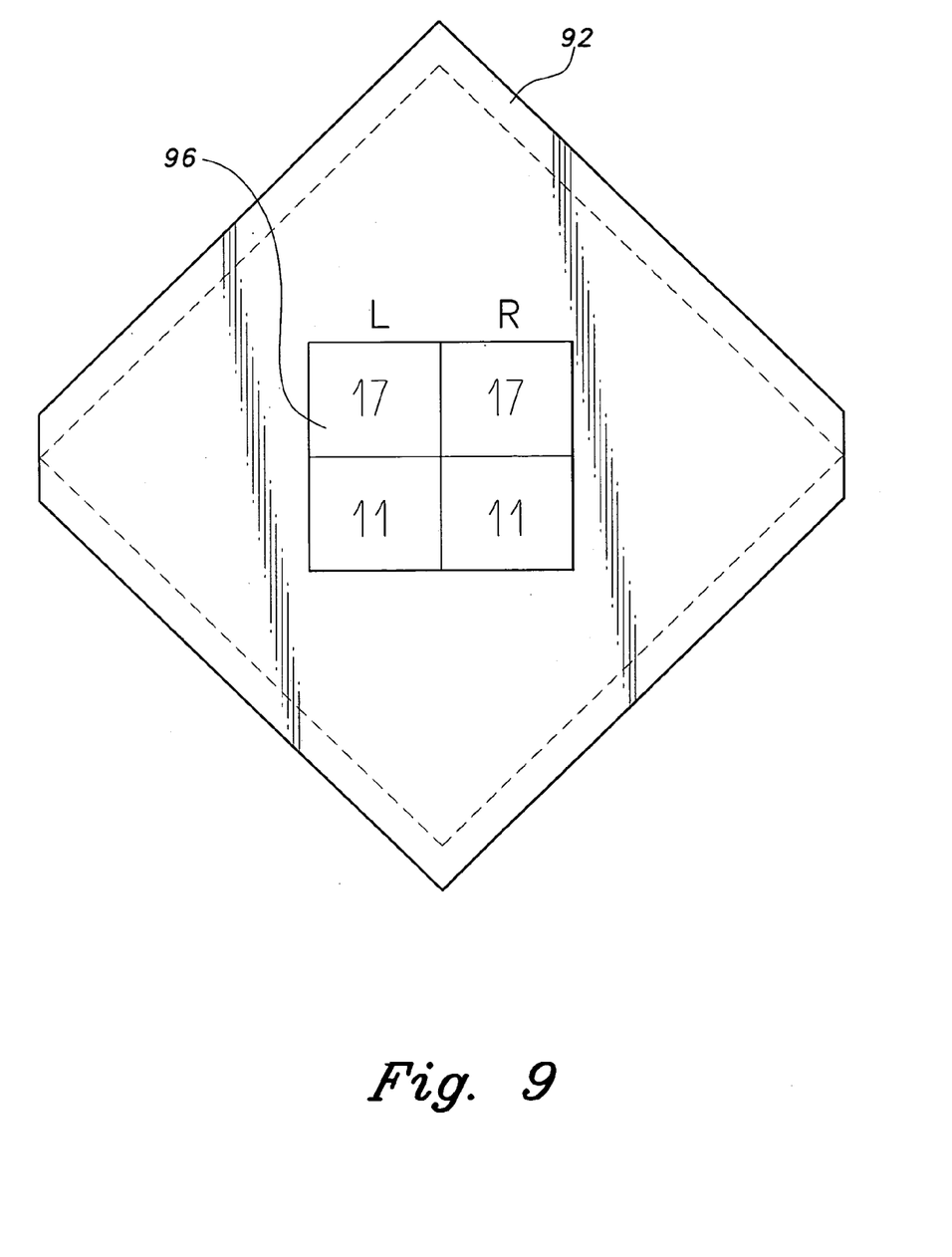
FIG. 9 is a fragmented, elevational view of a mirror assembly for a trailer hitch coupling kit according to the present invention.

The mirror assembly 90 includes a substantially flat base 92 with a mirror 94 secured to its front side, as shown in FIG. 3, and a demarcated area 96 for recording hinge setting information on its backside, as shown in FIG. 9. The base 92 is substantially square with a support leg 98 and 100 extending from each of two opposing corners.

Figure 6:
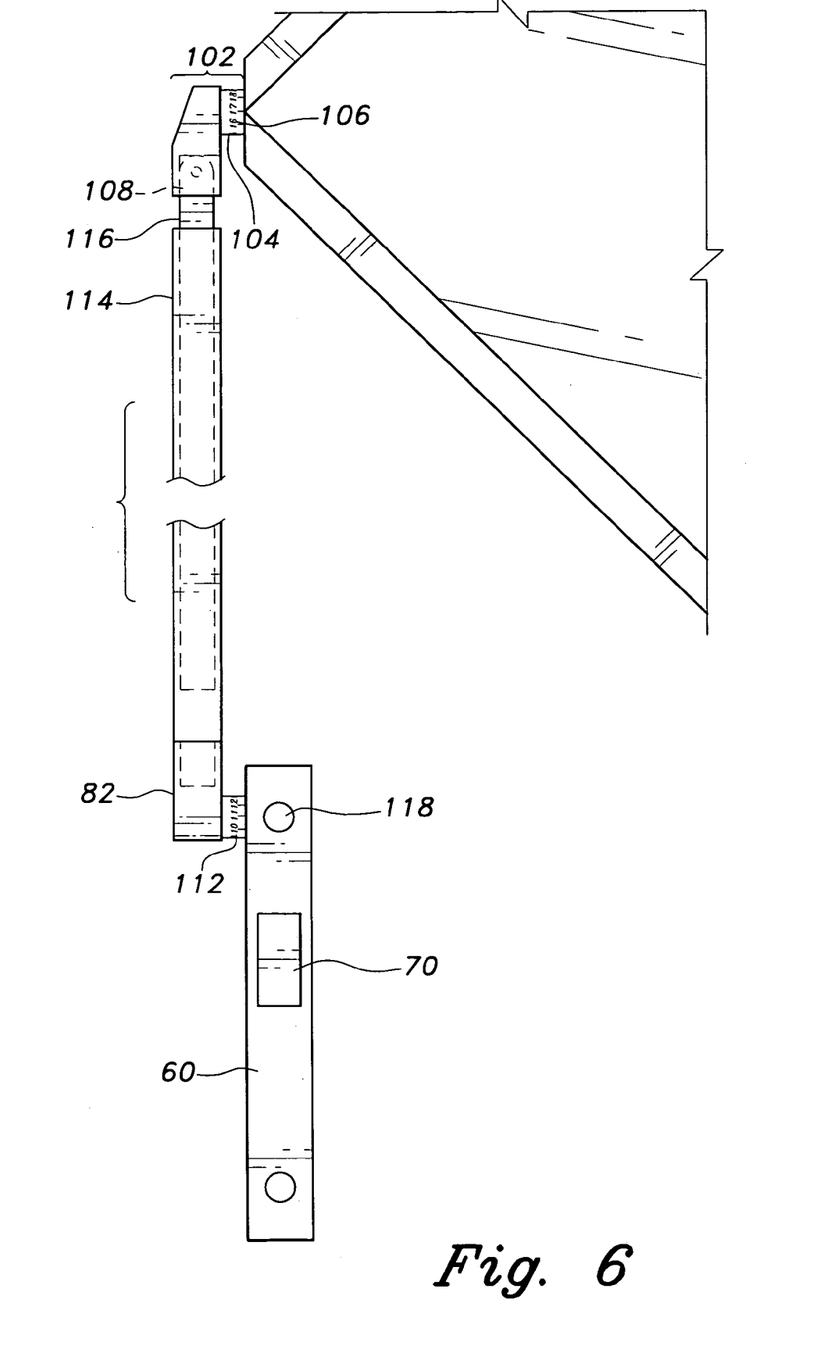
FIG. 6 is a fragmented, elevational view of a mirror assembly connected to a foot member of a trailer hitch coupling kit according to the present invention.
Figure 7:
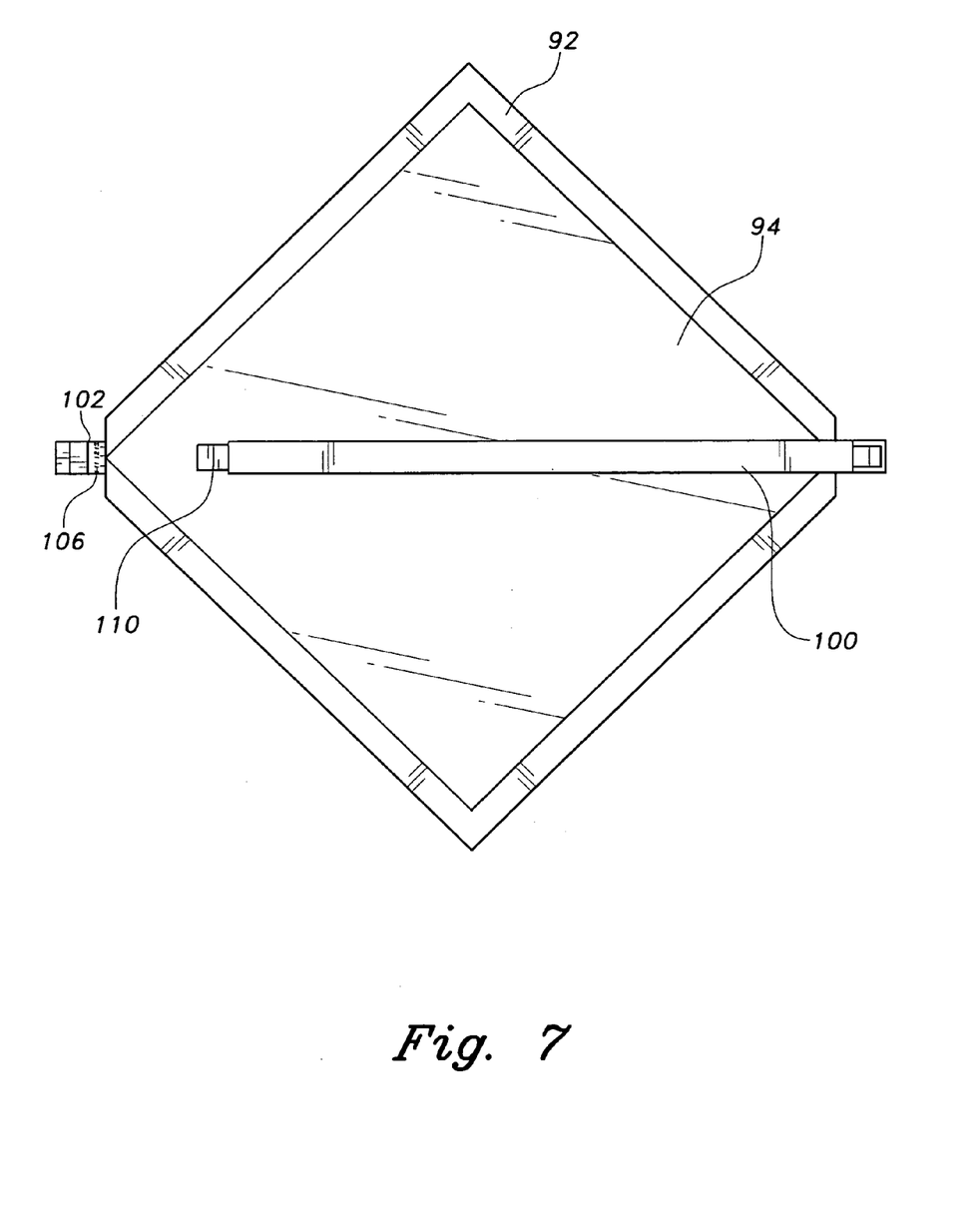
FIG. 7 is an elevational view of a mirror assembly for a trailer hitch coupling kit according to the present invention shown with its legs folded.

Each of the two support legs 98 and 100 has a square cross section and is connected to the base 92 via a sleeve and spindle hinge 102, as shown in FIG. 6. The sleeve and spindle hinge 102 allows the support leg 98 to rotate three hundred and sixty degrees relative to the base 92. The spindle 104 for each hinge is demarcated with graduated setting indicia 106 to allow a user of the invention to observe the setting that correlates with the angle between the base 92 and the support leg 98 and 100 that provides the best view of the tow ball. Each support leg 98 and 100 has a second hinge 108 that enables the support leg 98 and 100 to fold across opposite sides of the base 92 as shown in FIGS. 7 and 8. By folding one support leg 98 and 100 across each side of the base 92, the base 92 is better protected from breakage. Although not shown, the support legs 98 and 100 can also be folded across the same side of the base 92. As shown in FIG. 6, each support leg 98 and 100 is extendable by moving an outer sleeve 114 with finger pressure relative to an inner sleeve 116 that extends from the second hinge 108. The inner 116 and outer 114 sleeves are connected via a push fit engagement. At the distal end 110 of each support leg 98 and 100, a segment 110 of the support leg 98 and 100, shown in FIG. 7, has a square cross section with slightly smaller dimensions than the rest of the support leg 98 and 100 to facilitate push fit engagement with a foot member 60 and 62.

Figure 4:
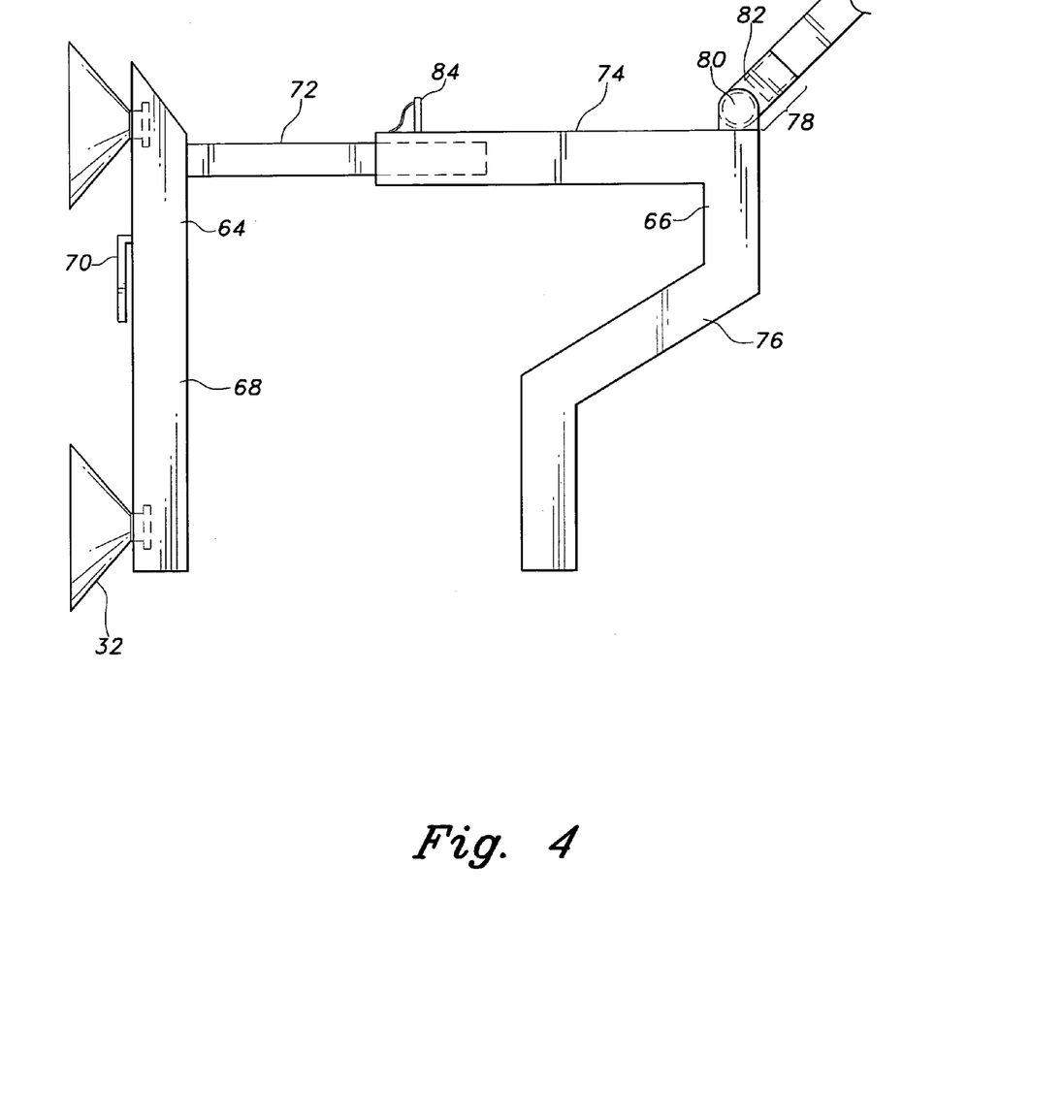
FIG. 4 is a side view of a foot member for a trailer hitch coupling kit according to the present invention shown connected to a fragmented mirror assembly support leg.

Referring to FIG. 4, each of the two foot members 60 and 62 is a clamp with a proximal member 64 and a distal member 66. The proximal member 64 has a vertical segment 68 with two suction cups 32 and a clip 70 extending from one side and a horizontal segment 72 extending from the opposite side. The distal member 66 has a horizontal segment 74 that mates with the horizontal segment 72 of the proximal member 64 via push fit engagement, a downward extending segment 76 and a support leg connector 78 extending from the top of the horizontal member 74. The support leg connector is a sleeve and spindle hinge 80 with a receiving leg 82 attached thereto 80. The spindle is demarcated with graduated setting indicia 112, as shown in FIG. 6. The receiving leg 82 is adapted to receive the distal end 110 of a support leg 98 and 100. A thumb brace 84, shown in FIG. 4, extends from the top of the horizontal segment 74 of distal member 66. Both the proximal 64 and distal members 66 are hollow with square cross sections. The suction cups 32 are attached to the proximal member 64 via an aperture 118, shown in FIG. 6, in the vertical segment 68 and can be easily detached and reattached.

Figure 10A:
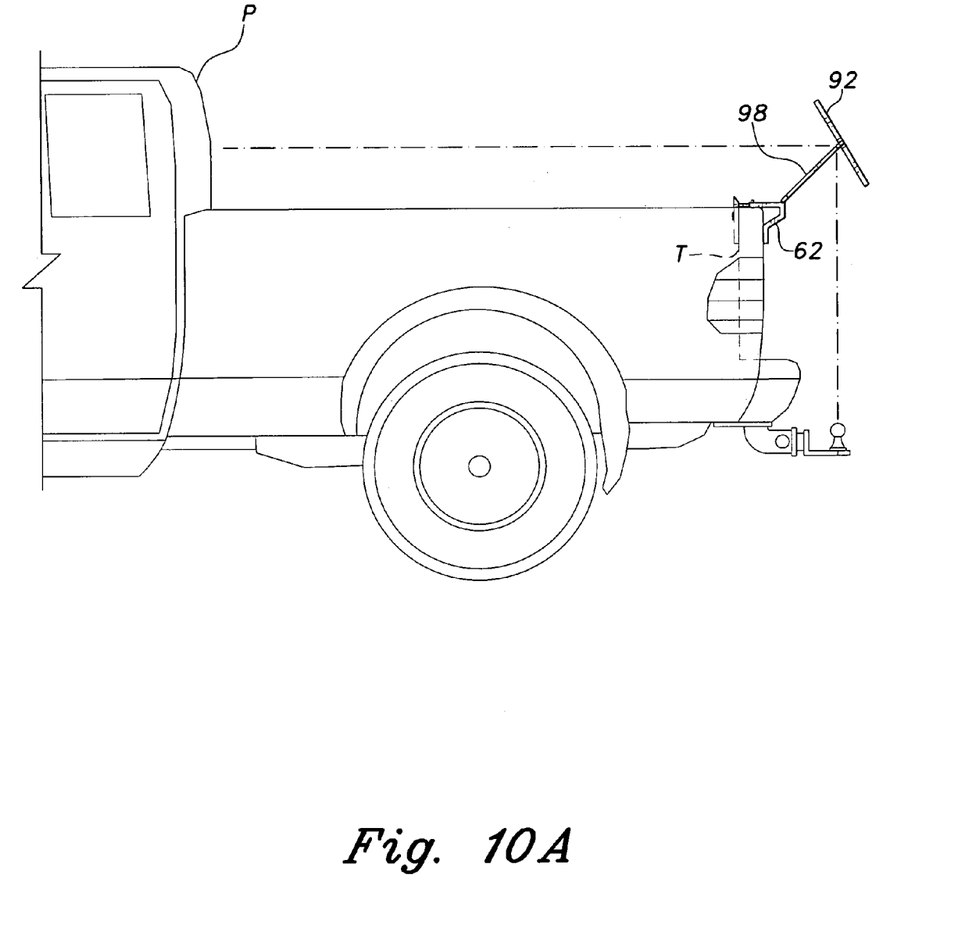
FIG. 10A is an environmental side view of a mirror assembly connected to a foot member of a trailer hitch coupling kit according to the present invention shown attached to the tail gait of a fragmented pickup truck.

The distance between the vertical segment 68 of the proximal member 64 and the downward extending segment 76 of the distal member 66 can be adjusted with finger pressure by adjusting the amount of the horizontal segment 72 of the proximal member 64 that is within the horizontal segment 74 of the distal member 66. By doing so, the foot member 60 and 62 can be clamped onto the tailgate T of a pickup truck P as shown in FIG. 10A.

Figure 1:
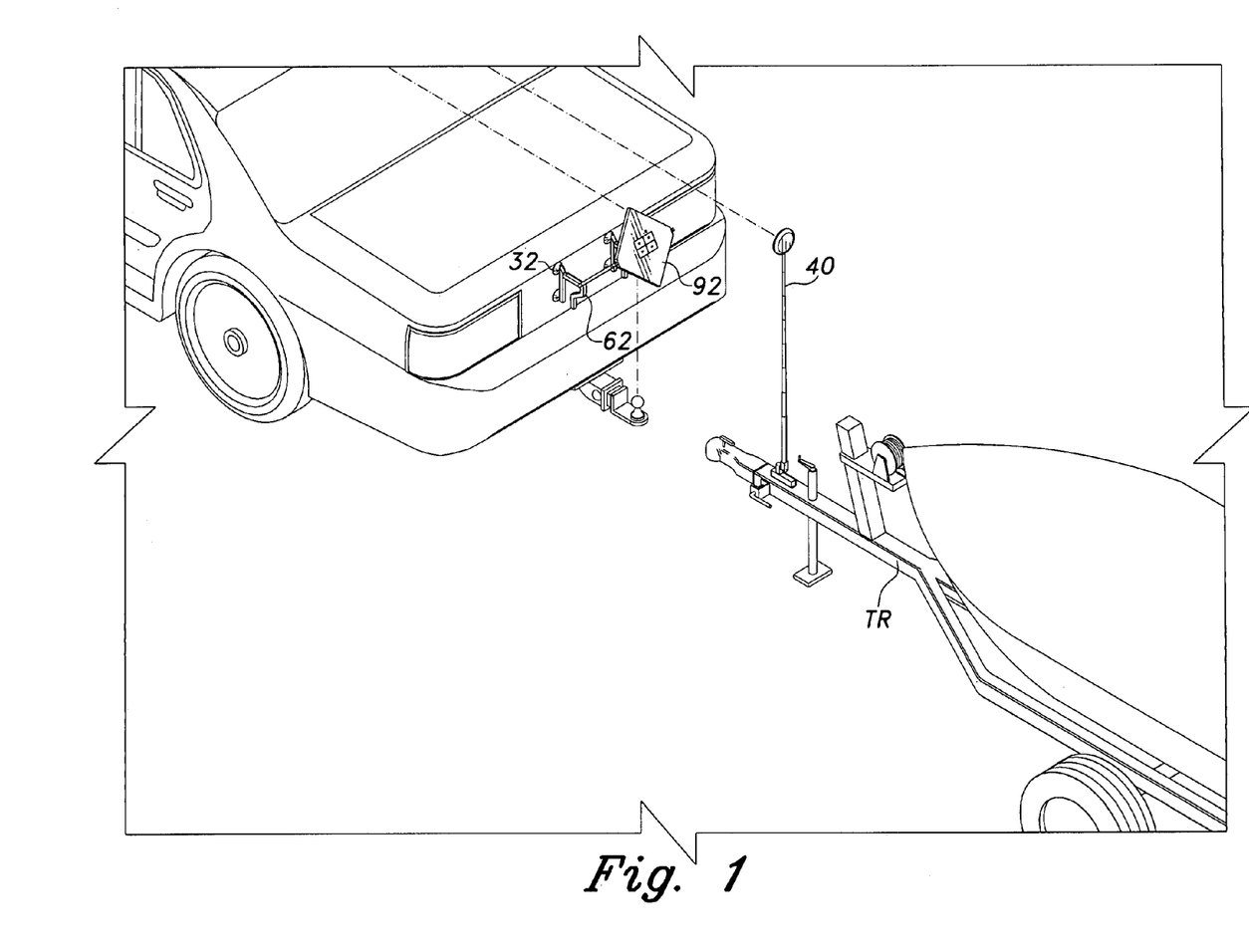
FIG. 1 is an environmental, perspective view of a trailer hitch coupling kit according to the present invention.
Figure 5A:
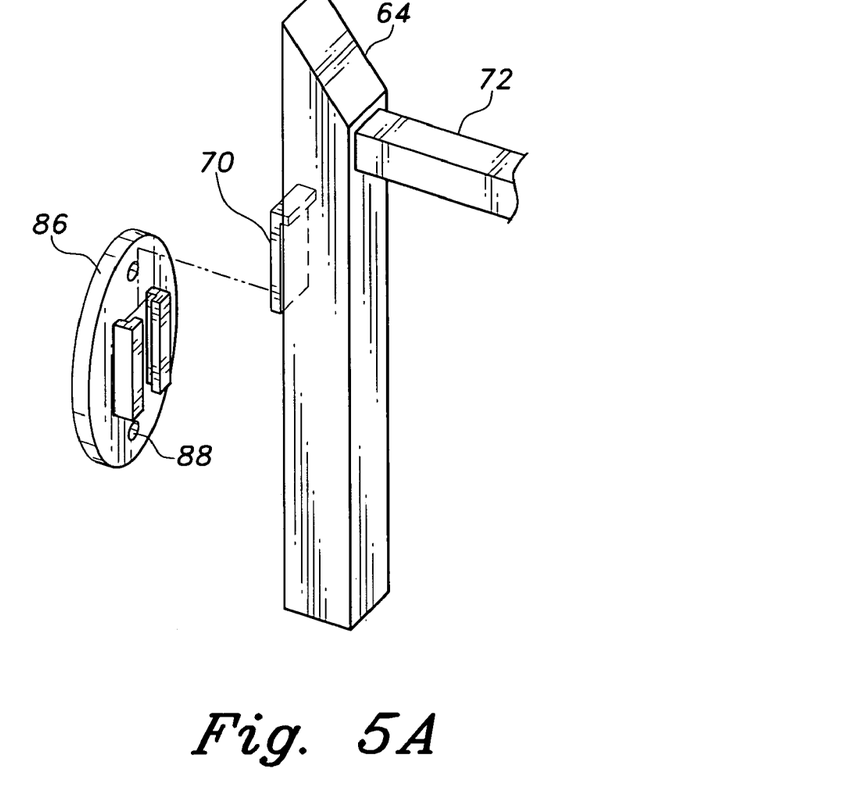
FIG. 5A is a fragmented view of a foot member shown in relation to a foot bracket for a trailer hitch coupling kit according to the present invention.
Figure 5B:
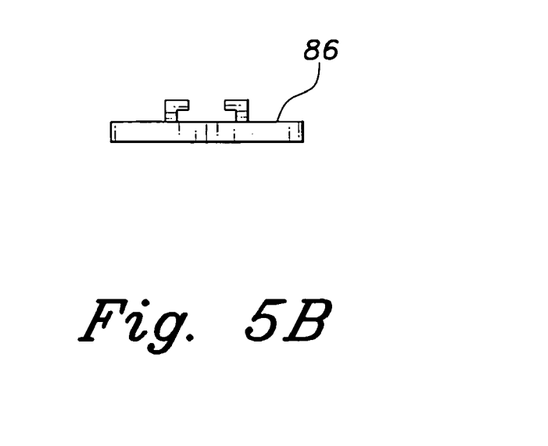
FIG. 5B is a top view of a foot bracket for a trailer hitch coupling kit according to the present invention.
Figure 10B:
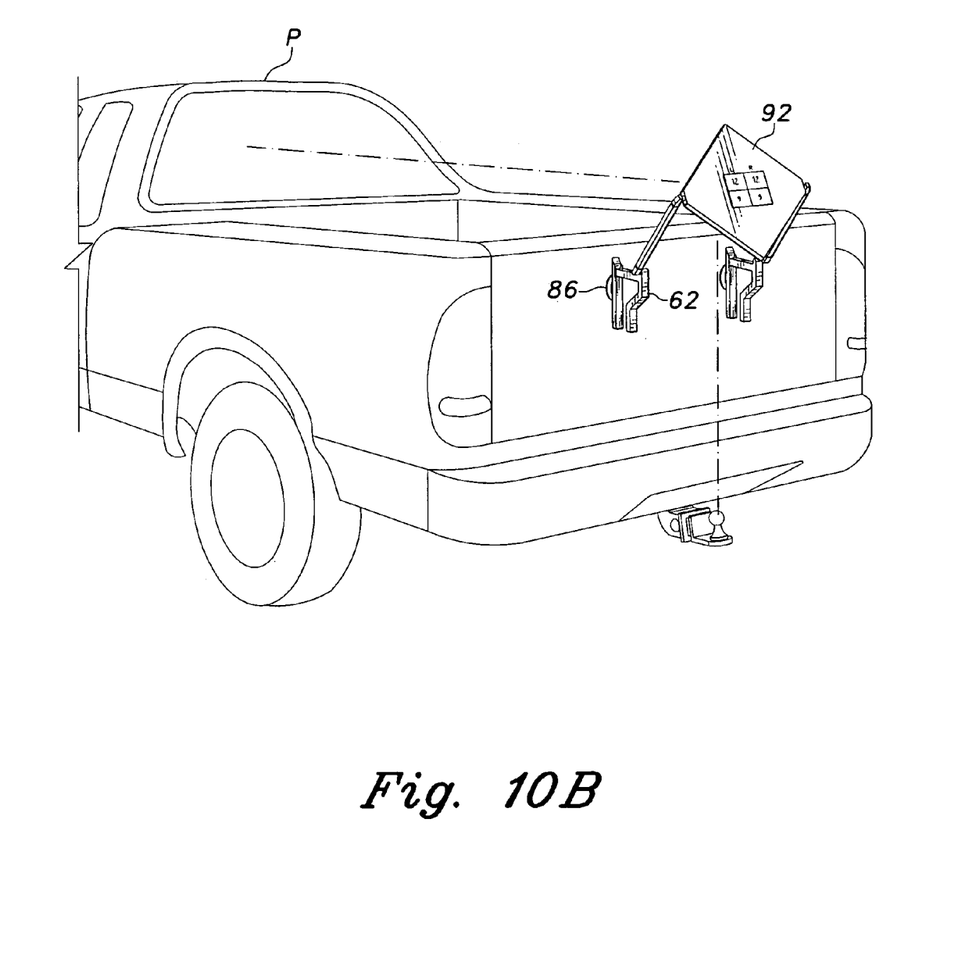
FIG. 10B is an environmental, perspective view of a mirror assembly connected to a pair of foot members of a trailer hitch coupling kit according to the present invention shown attached to the tail gait of a fragmented pickup truck.

In addition to clamping onto a tailgate, the foot member 60 and 62 can be attached to a towing vehicle using its suction cups 32 as shown in FIG. 1 or by inserting its clip 70 into a mating bracket 86 as shown in FIG. 10B. The bracket 86, shown in FIGS. 5A and 5B, has two apertures 88 for permanent mounting onto a towing vehicle.

Figure 2:
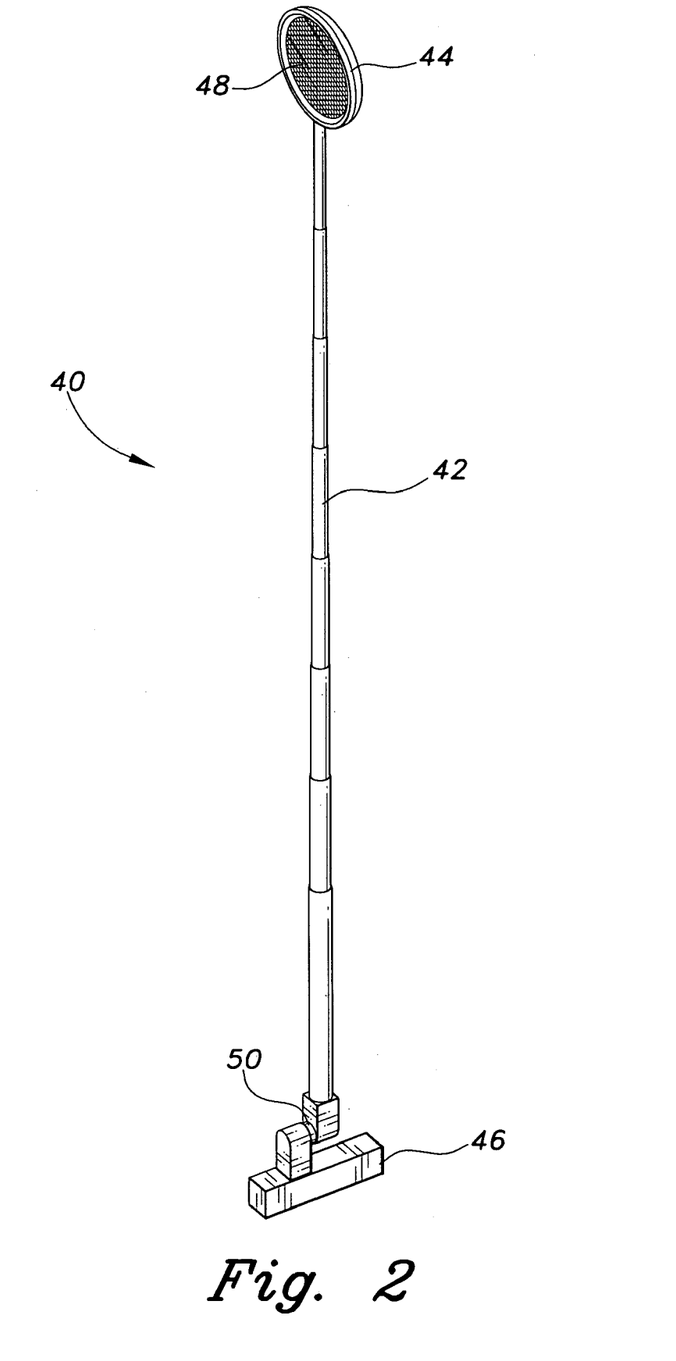
FIG. 2 is a perspective view of a guidepost for a trailer hitch coupling kit according to the present invention.

Referring to FIG. 2, the guidepost 40 includes a telescoping rod 42 with a reflective disk 44 attached to one end and a magnet 46 attached to the other end. The reflective disk 44 is a disk with reflective material 48 attached to each of its sides. The magnet 46 is attached to the telescoping rod 42 via a sleeve and spindle hinge 50 and enables the guidepost 40 to be securely attached to the drawbar of a trailer TR as shown in FIG. 1.

The ideal settings for the two sleeve and spindle hinges 102 that connect the support legs 98 and 100 to the base 92 and the two sleeve and spindle hinges 80 incorporated in the support leg connectors 78 can be recorded in the demarcated area 96 as shown in FIG. 9.

The carrying case 22, shown in FIG. 8, is container adapted to receive and store the mirror assembly 90, the pair of foot members 60 and 62, the suction cups 32 and the guidepost 40. It 22 is constructed of a pliable material, has an open side 24 with a folding flap 26 and has a closing clasp 28. It can also be constructed of a rigid material.

The kit 20 provides the driver of a towing vehicle with both a view of the tow ball and a reference to the location of the trailer coupler while in the driver's seat. (FIG. 1) Thus, the kit 20 allows the driver to precisely align the trailer coupler socket over the tow ball without leaving the towing vehicle. The components 32, 40, 60, 62 and 90 of the kit 20 are easily assembled and disassembled, conveniently store in the carrying case 22, and can be constructed primarily of metal, plastic or a combination thereof. The mirror assembly 90 is configured to easily adjust into the position that presents the best view of the tow ball and provides a means for recording that position. The pair of foot members 60 and 62 allows the mirror assembly 90 to be attached to a vehicle with suction cups 32, with a clip 70 and bracket 86 or with the foot member 60 and 62 clamped to a tailgate.

It is to be understood that the present invention is not limited to the embodiments described above, but encompasses any and all embodiments within the scope of the following claims.

We claim:

1. A trailer hitch coupling kit for aiding a driver in coupling the tow ball of a towing vehicle and the socket of a trailer coupler, by enabling the driver to view the tow ball and a guidepost mounted above the trailer coupler while seated in the driver's seat of the towing vehicle, comprising:
   a mirror assembly having a mirror base being substantially flat with a front side and a back side, a mirror secured to said front side of said mirror base, and two support legs pivotally connected to said mirror base;
   means for attaching said mirror assembly to the rear of a towing vehicle;
   a trailer coupler guidepost comprising a rod having a first and second end, and a visual aid attached to said first end of said rod;
   means for attaching said trailer coupler guidepost to a trailer drawbar; and
   a carrying case.

2. The trailer hitch guide kit according to claim 1, wherein said mirror and said mirror base are substantially square.

3. The trailer hitch guide kit according to claim 1, further comprising at least one demarcated area for recording mirror setting information, said demarcated area located on said back side of said mirror base.

4. The trailer hitch guide kit according to claim 1, wherein each of said support legs has a substantially square cross section.

5. The trailer hitch guide kit according to claim 1, wherein each of said support legs is connected to said mirror base via a sleeve and spindle hinge with graduated markings on the spindle.

6. The trailer hitch guide kit according to claim 1, wherein said means for attaching said mirror assembly to the rear of a towing vehicle is a first and second foot member, wherein each of said first and second foot member is a clamp having a proximal member and a distal member;
   each of said proximal member is comprised of a vertical segment with two suction cups attached thereto and a horizontal segment extending substantially horizontally from said vertical segment; and
   each of said distal members is comprised of a horizontal segment which mates with said horizontal segment of said proximal member via push fit engagement, a downward extending segment that extends downward from said horizontal segment of said distal member, and a means for connecting to one of said support legs of said mirror assembly.

7. The trailer hitch guide kit according to claim 6, wherein said means for connecting to one of said support legs of said mirror assembly is a spindle and sleeve hinge extending from said horizontal segment of each of said distal members.

8. The trailer hitch guide kit according to claim 1, wherein said rod of said trailer coupler guidepost is telescoping and said visual aid is a disk having a first side and a second side with reflective material attached to each of said first side and said second side.

9. The trailer hitch guide kit according to claim 1, wherein said means for attaching said trailer coupler guidepost to a trailer drawbar is a magnet pivotally connected to said second end of said rod of said trailer coupler guide post.

10. The trailer hitch guide kit according to claim 1, wherein said carrying case is adapted to receive said mirror assembly, said means for attaching said mirror assembly to the rear of a towing vehicle, said trailer coupler guidepost and said means for attaching said trailer coupler guide post to a trailer drawbar.

* * * * *